United States Patent [19]

Mitchell

[11] Patent Number: 4,506,446
[45] Date of Patent: Mar. 26, 1985

[54] TAPE MEASURE HAVING TWO TAPES

[76] Inventor: Rodger Mitchell, 921 Pontiac, Wilmette, Ill.

[21] Appl. No.: 468,327

[22] Filed: Feb. 22, 1983

[51] Int. Cl.³ .............................................. G01B 3/10
[52] U.S. Cl. .................................................... 33/139
[58] Field of Search ......................... 33/138, 139, 140

[56] References Cited

U.S. PATENT DOCUMENTS

| 2,240,753 | 5/1941 | Bouchard et al. | 33/138 |
| 3,885,314 | 5/1975 | Banas, Sr. | 33/138 |
| 4,186,490 | 2/1980 | Quenot | 33/139 |

FOREIGN PATENT DOCUMENTS

| 812612 | 9/1951 | Fed. Rep. of Germany | 33/139 |
| 925075 | 3/1955 | Fed. Rep. of Germany | 33/138 |
| 116021 | 3/1946 | Sweden | 33/139 |
| 2052745 | 1/1981 | United Kingdom | 33/138 |

*Primary Examiner*—Richard R. Stearns
*Attorney, Agent, or Firm*—August E. Roehrig, Jr.

[57] ABSTRACT

Two mutually exclusively operable tape measures mounted in a housing such that each tape is adapted to extend linearly from opposite ends of the housing. Each tape measure is adapted to engage a series of gears which, when engaged, turn a counter to total the distance to which the tapes are linearly extended from the housing.

Only one of the two tapes may be engaged at one time. Upon the extension of either of the two tapes, the counter is actuated to register the total distance between the ends of the tapes.

7 Claims, 4 Drawing Figures

TAPE MEASURE HAVING TWO TAPES

BACKGROUND OF THE INVENTION

This invention relates in general to measuring devices and, in particular, to tape-type, linear measuring devices. More specifically, but without restriction to the particular use which is shown and described, this invention relates to an improved tape measuring device with two tapes adapted for measuring the linear distance between two points from any point therebetween, and registering the combined distance between the distal ends of the tapes on a counter.

To measure the linear distance between two points with a single tape measuring device, it is necessary to secure the end of the tape at one end point while making the reading at the opposite end point. This is often inconvenient, and sometimes impossible, for example, when measuring the distance between a floor and ceiling.

Another problem frequently encountered is measuring the total linear distance of two divergent lengths, such as when calculating the perimeter of a window frame. In order to measure the divergent linear dimensions of a structure, such as a window frame, with a single tape measuring device, it would be necessary to make at least two separate measurements.

It is, therefore, desirable to measure the distance between two points while locating the measuring device at any point therebetween. Also, it is desirable to measure the sum of two distances, such as the vertical and horizontal dimensions of a window frame, while locating the measuring device at the intersection of the two linear dimensions.

The prior art has attempted to solve these problems by utilizing measuring devices with two or more tapes in a single housing. One such device is disclosed in the A. Bouchard, U.S. Pat. No. 2,240,753. This device uses two simultaneously actuated measuring tapes enclosed in a single housing. By extending either tape, the other tape is simultaneously extended by a common set of gears from the opposite side of the housing the same distance. While somewhat beneficial over a single tape measuring device, because both tapes extend an identical distance, the Bouchard prior art device only measures from a point exactly central to the two linear end points. While this device may be suitable to mark off a set distance, it is not convenient for measuring an unknown distance since the exact center is not known, requiring movement of the housing until it is positioned exactly in the center of the unknown distance.

Another two-tape measuring device is disclosed in A. J. Banas, U.S. Pat. No. 3,885,314. This prior art discloses two tape measures in separate compartments of a single housing, allowing measurements to be taken in opposed directions. Since both tapes work independently of each other, the total linear distance can not be automatically determined. This device still requires two separate measurements to be taken, in a manner similar to using a single tape measuring device twice. This device contains no provision for determining the total distance between the ends of the tapes.

The present invention is adapted to solve the problems inherent in the prior art devices. This invention can be utilized to measure the total linear distance between two end points, using two tapes extending from opposite sides of a housing. When either tape is extended, the total distance between the tape ends is registered on a counter mounted in the housing. This allows a desired measurement to be taken anywhere between two end points, with the total distance between the two end points of the tape being shown on the counter.

In addition, this invention allows measurements to be taken simultaneously, which previously required two or more separate measurements. For example, one tape can measure the rise of a step, while the other tape measures the run. The total of both rise and run distances then is summed on the counter. This could be useful in making a measurement for carpeting stairs. A similar use could be in measuring the height and width of a window frame, with the number registering on the counter being one-half of the perimeter of the window frame, in determining board feet requirements.

SUMMARY OF THE INVENTION

It is, therefore, an object of this invention to improve tape measuring devices.

Another object of this invention is to enable the linear distance between two points to be measured from any point therebetween.

A further object of this invention is to enable the linear distance between the intersection of two divergent lines, and their respective end points, to be measured from the intersection of the two lines.

Still another object of this invention is to enable the linear distance between two points to be measured by extending two mutually exclusively operable tapes in opposing directions, while registering the total length of the two extended tapes on a counter.

Another object of this invention is to allow successive linear measurements to be taken along separate divergent linear directions, with the sum total of these linear distances registering on the counting means.

Still another object of this invention is to allow successive linear measurements to be taken in the same direction, along a linear distance too long for a single measurement, with the sum total registering on a counter.

These and other objects are attained in accordance with the present invention wherein there is provided two mutually exclusively operable tape measures mounted in a housing such that each tape is adapted to extend linearly from opposite ends of the housing. Each tape measure is adapted to engage a series of gears which, when engaged, turn a counter to total the distance to which the tapes are linearly extended from the housing.

Only one of the two tapes may be engaged at one time. Upon the extension of either of the two tapes, the counter is actuated to register the total distance between the ends of the tapes.

DESCRIPTION OF THE DRAWINGS

Further objects of the invention together with additional features contributing thereto and advantages accruing therefrom will be apparent from the following description of a preferred embodiment of the invention, which is shown in the accompanying drawings with like reference numerals indicating corresponding parts throughout, wherein.

DETAILED DESCRIPTION OF THE PREFERRED EMBODIMENT OF THE INVENTION

Figure 1:
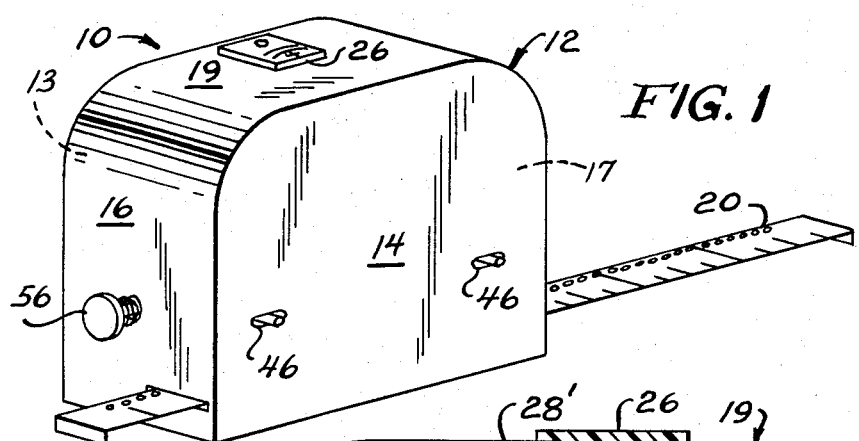
FIG. 1 is a perspective view of the present invention.
Figure 2:
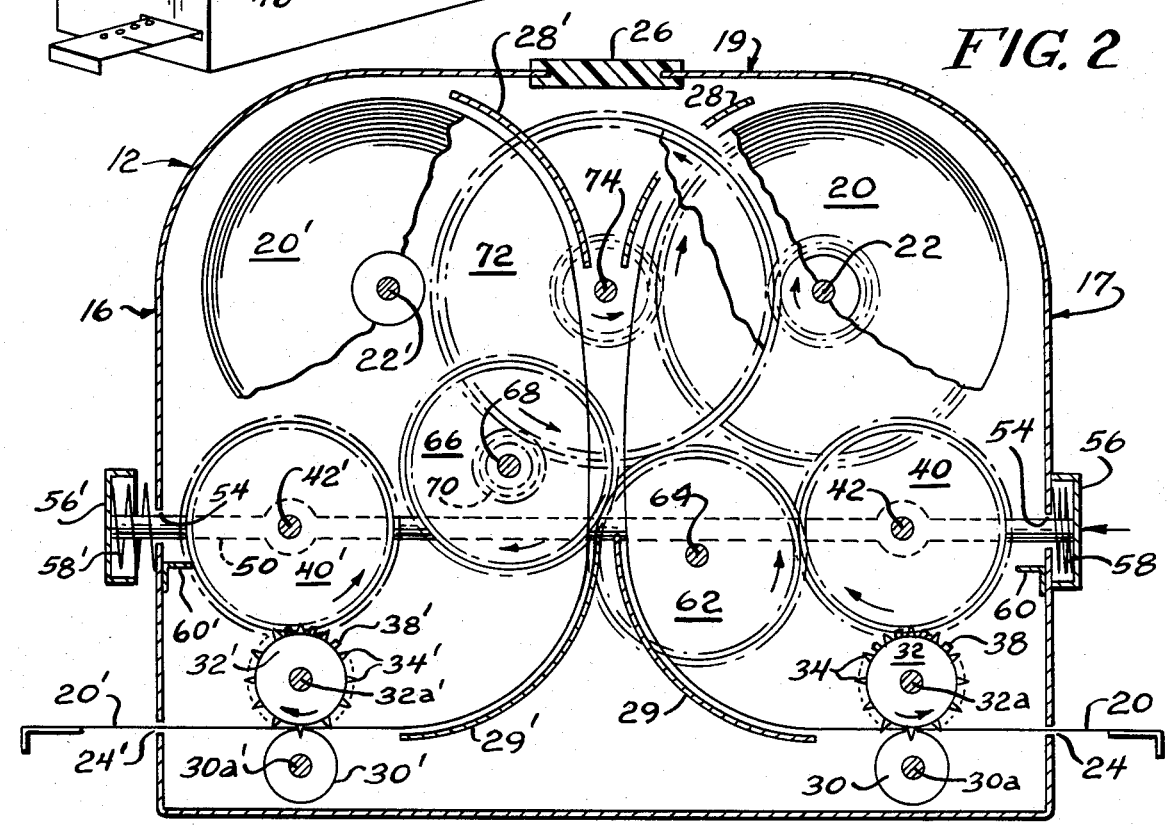
FIG. 2 is a front view of the present invention with portions of the housing broken away.
Figure 3:
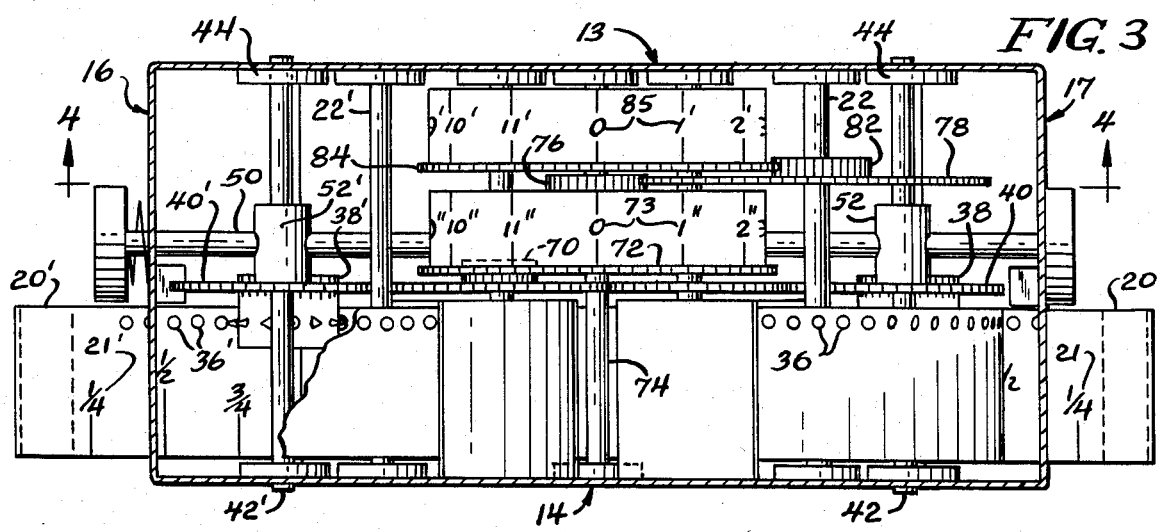
FIG. 3 is a top view of the invention with the housing broken away.

Referring now to FIG. 1, there is shown a dual tape tape measure 10, which includes a housing 12, generally rectangular in shape and enclosing the inner workings of the tape measure device 10. This housing includes a rear housing wall 13, a front housing wall 14, a left housing wall 16, a right housing wall 17, and an upper housing wall 19. Hereinafter if a direction is indicated, it will be meant to indicate the direction toward the respective side of the housing as shown in FIGS. 2 and 3.

Contained within the housing 12 and adapted to extend from opposing sides of the housing, are a right tape 20 and a left tape 20'. The right tape 20 extends from the right housing wall 17 through a slot 24. The left tape 20' extends from the opposing left housing wall 16 through a slot 24'. The tapes 20 and 20' are marked with a system of linear measuring indicia 21, 21', such as, for example, inches or centimeters. Mounted in the upper housing surface 19 is a counting wheel window 26 for a purpose which will be hereinafter described in detail.

For convenience of illustration, the workings of the right tape 20 will be described in detail, with it being understood that the left side is a mirror image of the right side, except where otherwise indicated and described. For further convenience of illustration, the right tape 20 is coiled and mounted in the upper right hand quadrant of the tape measure 10 as shown in FIG. 2. The tape 20 is coiled and mounted for retractable movement from the housing in a manner well known in the art of flexible metal, retractable tape measures. The tape 20 is coiled about an axle 22, which extends the entire width of the housing 12 and is suitably supported by the front wall 14 and the rear wall 13 as shown in FIG. 3. Referring now to FIG. 2, as the tape is uncoiled by being withdrawn from the housing, it is guided by an upper tape guide 28 secured upon the front housing wall 14 which guides the tape toward the bottom of the housing. In the lower section of the housing 12, the tape 20 is guided by a lower tape guide 29 suitably secured upon the front housing wall 14, which guides the tape 20 toward the right wall 17.

Between the lower tape guide 29 and adjacent the right housing wall 17, as positioned a tape support roller 30 and a drive cog gear 32 suitably supported for rotation on axles 30a and 32a extending between walls 13 and 14. The tape support roller 30 is positioned near the bottom of the housing 12 such that the tape 20 extends across the top of the tape support roller. The drive cog gear 32 is positioned directly above the tape support roller 30 and on one end is formed with a plurality of drive cogs 34 which are adapted to sequentially engage a plurality of cog apertures 36 formed in the rear facing edge of the tape 20. The tape 20 extends between the tape support roller 30 and the drive cog gear 32, such that the drive cogs 34 extend through the cog apertures 36 and engage a soft material covering formed on the surface of the tape support roller 30, or the roller itself may be formed from a material into which the drive cogs 34 may penetrate. As tape 20 is extended from the housing 12, through the tape slot 24, the linear motion of the tape 20 is thereby translated into rotational motion of the drive cog gear 32.

The back side of the gear 32 is formed with a plurality of gear teeth 38. The gear teeth 38 of the gear 32 are adapted to engage a larger gear 40 rotatably supported above the gear 32 and rotatably mounted on axle 42. The axle 42 extends the entire width of the housing from outside the rear wall 13 through a rear slot 44 through a front slot 46. The slots 44 and 46 support the axle 42 for rotational movement and allow lateral motion of the axle 42 and the gear 40 within the limits of the slots. The lateral motion of the axle 42 and gear 40 is effected by a gear shifter rod 50 which is connected to the axle 42 by means of a shifter bushing 52. The shifter 50 extends the entire length of the housing 12, extending through a pair of gear shifter slots 54 and 54' in the housing walls 16 and 17.

As shown in FIGS. 2 and 3, the ends of the shifter 50 are formed as actuating knobs 56 and 56'. Between the actuating knobs 56, 56' and the housing walls 16, 17 are coils encircling the shifter springs 58,58'. The springs 58, 58' are positioned with one end within a cap portion of the knob 56, 56' and the other end contacting the wall 16 or 17 of the housing to apply an outwardly directed force against the actuating knobs 56, 56' when compressed. The actuating knob 56 and biasing spring 58 may be moved into an actuating or engaging position as shown on the right side of FIGS. 2 and 3, or it may be moved into an open disengaging position as shown on the left side of FIGS. 2 and 3 for sequentially engaging the tapes 20, 20' with the counter in a manner hereinafter described in detail.

To the right of the gear 40, mounted on the right wall 17, is a stop 60 for engaging gear 40 to prevent the rotation thereof. As previously described, the shifter 50 is adapted to move laterally within the housing, thereby moving the gear 40, 40' into or out from a position for actuating a counting mechanism. When the actuating knob 56 is in the outermost position, the gear 40 engages the stop 60, thereby preventing movement of the gear 40 or the tape 20. When the actuating knob 56 is pushed into the actuating position, the gear shifter 50 moves laterally causing the gear 40 to move to the left disengaging the stop 60 and engaging a reverse idler gear 62, rotatably mounted on an axle 64. The reverse idler gear 62 is the same size as the gear 40 and functions to transfer the clockwise rotation of gear 40 into counter-clockwise rotation so the extension of either tape will move the counter wheels, hereinafter described in the same direction. Axle 64 extends the width of the housing 12 and is suitably supported by the rear wall 13 and the front wall 14.

There is no reversing idler gear necessary on the left side of the housing as the purpose of the gear 62 is to make the net rotational movement caused by a withdrawal of tape 20 to be the same as 20'. On the left side of the housing 12, the gear 40' engages a stop 60' when the actuating knob 56' is in the outer disengaging position. When the actuating knob 56' is moved inwardly to the actuating position, the gear 40' disengages from the stop 60' moving laterally to the right to engage a counter drive gear 66. The counter drive gear 66 is positioned between the gear 62 and the gear 40' and is continuously engaged with the gear 62, and selectively engages gear 40' when the actuating knob 56' is in the closed position. The gear 66 is mounted on an axle 68 which extends the entire width of the housing being suitably supported by the rear wall 13 and the front wall 14.

Attached concentrically to the rear of the gear 66 is a reduction gear 70. The gear 70 engages the gear teeth of first display wheel 72, which is mounted on an axle 74 positioned in the center of the housing 12 and extending between the rear wall 13 and the front wall 14 to which it is suitably attached for rotation relative thereto.

The display wheel 72 includes a suitable system of linear dimensional indicia 73 which may be viewed through the counting wheel window 26 located in the upper housing wall 19. As known to those skilled in the art, the gear ratios of the gear 70, and the display wheel 72 may be set so as to make it convenient to read the desired dimensional data through the window 26.

Figure 4:
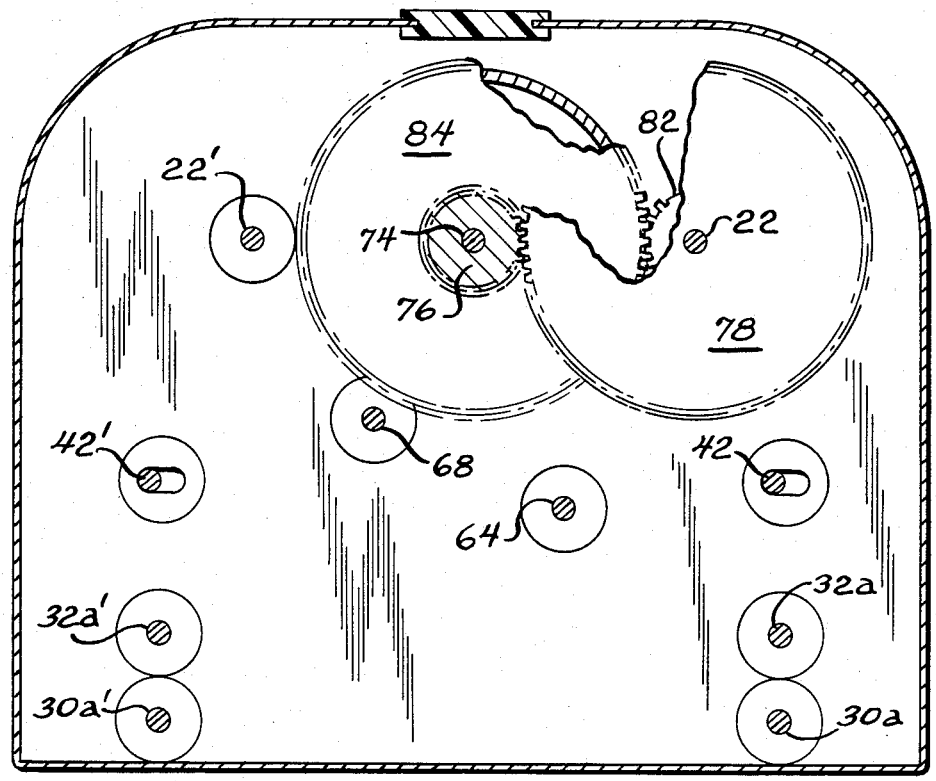
FIG. 4 is a cross sectional view taken along line 4—4 of FIG. 3.

Referring now to FIG. 4, attached concentrically to the display wheel 72 is a smaller gear 76. Positioned to the right of the gear 76 is a larger, second counting gear 72 which operatively engages the gear 76. The second counting gear 78 is mounted on the tape axle 22 which extends the entire width of the housing 12, being suitably mounted on the rear wall 13 and the front wall 14.

Concentrically attached to the second counting gear 78 is a smaller gear 82 which engages a large display wheel 84. The display wheel 84 is mounted on the axle 74 concentrically with the gear 76 and first display wheel 72. The display wheel 84 includes a system of linear dimensional indicia 85 designed to indicate a first set of units defining a length to which a tape 20 or 20' has been extended, for example, feet or meters. The ratios of gear 76, gear 82 and second counting gear 78 are such that when the first counting gear 72 makes one complete revolution, for example, twelve inches of tape movement, the display wheel 84 will rotate as to indicate, for example, one foot in distance. While feet and inches are used for illustrative purposes, the two systems of units could also be centimeters and meters or any other linear dimensional indicia.

The present invention is designed so that only one tape 20 or 20' is utilized at a time. In order to operate the tape 20, the actuating knob 56 is pressured inwardly into actuating position, the gear shifter 50 moves laterally to the left in the housing 12, causing the gear 40 to disengage from the stop 60, and engage with the reverse idler gear 62.

On the opposing side of the housing 12, this movement of gear shifter 50 causes the gear 40' to move laterally to the left disengaging from counter drive gear 66, and engaging with the stop 60', thereby rendering the gear 40' immovable. The tape 20 can then be extended from the right side of the housing 12. The tape 20 is extended from the housing 12 through the tape slot 24 to a desired length such as one end of an unknown dimension. As the tape 20 is extended, the cog apertures 36 are engaged by the drive cogs 34 thereby translating the linear motion of the tape 20, into rotational motion of the drive cog gear 32. As the tape 20 is extended to the right, the drive cog gear 32 rotates in a counter-clockwise direction. The teeth of gear 40, which are engaged with the gear teeth 38 on the rear side of the drive cog gear 32, are thereby chosen to rotate in a clockwise direction.

Since movement of the gear shifter 50 causes the gear 40 to be engaged with the reverse idler gear 62, the reverse idler gear will rotate in a counter-clockwise direction. This motion of the reverse idler gear 62 being meshed with the counter drive gear 66 will rotate the counter drive gear in a clockwise direction.

To operate the tape 20' located on the left side of the housing 12, the same operation is used, except that there is no reverse idler gear 62. This is because the gear 40' rotates in a counter-clockwise direction when the tape 20' is withdrawn from the housing. Therefore, when gear 40' is moved into engagement with counter drive gear 66, the counter-clockwise rotation of gear 40 will cause the desired clockwise direction of the counter drive gear 66.

The linear movement of either of the tapes 20 or 20' will cause the counter drive gear 66 to rotate in a clockwise direction with the number of revolutions corresponding to the gear ratios selected. As the drive counter gear 66 rotates in a clockwise direction, the reduction gear 70 which is concentrically attached to the rear of counter drive gear 66 will rotate therewith in a clockwise direction. The reduction gear 70, engaged with the first counting gear 62 causes the gear to rotate in a counter-clockwise direction. The first counting gear 62 is marked with linear dimensional indicia 73 such as for example, inches or centimeters, so as one of the tapes 20 or 20' is extended the display wheel 72 will rotate to indicate the corresponding linear distance the tape 20 or 20' has been extended.

As the display wheel 72 rotates in a counter-clockwise direction, the gear 76 which is concentrically attached, also rotates about the axle 74 in a counter-clockwise direction. The gear 76 is engaged with the gear 78, so that the counter-clockwise rotation of gear 76 causes the gear 78 to rotate in a clockwise direction. As the gear 78 rotates in a clockwise direction, the smaller gear 82, attached concentrically to the rear of the gear 78, also rotates about the tape axle 22 in a clockwise direction.

The gear 82 engages the display wheel 84, which is mounted concentrically directly behind the gear 76. When the gear 82 rotates in a clockwise direction, it causes the display wheel 84 to rotate in a counter-clockwise direction. The display wheel 84 is marked with the linear dimension indicia 85 for a larger unit of measurements, such as, for example, feet or meters. While the gear ratios may be varied as desired by those skilled in the art, it is preferable that the gear ratios be set such that when the gear 72 makes one complete rotation, to indicate 12 inches or 10 centimeters, the display wheel 84 rotates so as to show a correspondingly larger unit, such as, for example, one foot or one meter.

While the invention has been described with reference to a preferred embodiment, it will be understood by those skilled in the art that various changes maybe made and equivalents maybe substituted for elements thereof without departing from the scope of the invention. In addition, any modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A tape measuring device comprising
   a housing for enclosing a plurality of tape measuring means having formed thereon a system of indicia adapted to measure a linear distance,
   a plurality of tape measuring means carried within said housing and adapted to extend therefrom to measure a linear distance, gear means mutually exclusively operatively connected to each of said plurality of said tape measuring means for transferring linear displacement of said tape measuring means into a corresponding rotational motion, gear shifting means extending through said housing and operatively connected to said gear means for mutually exclusively engaging said gear means with said plurality of tape measuring means, and counting means carried within said housing and operatively connected to said gear means to sequentially register the sum of the linear distances to which each of said tape measuring means have been extended from the housing.

2. The device as set forth in claim 1 further including means to allow the sum of the distance registered on said counting means to be viewed from outside of said housing.

3. The device as set forth in claim 1 wherein each one of said plurality of tape measuring means adapted to extend from said housing for measuring a linear distance includes a plurality of apertures formed therein, and, said gear means includes a cog gear, carried within said housing positioned to operatively engage said plurality of apertures to translate the linear motion of said plurality of tape measuring means into a corresponding rotational motion.

4. The device as set forth in claim 1 wherein said gear means includes a counter-drive gear mutually exclusively engaged with said plurality of tape measuring means for transferring the rotational motion resulting from the extension of said plurality of tapes to said counting means.

5. The device as set forth in claim 4 wherein said gear shifting means includes a shifter rod operatively connected to a plurality of gears for the selective engagement of said counter-drive gear with one of said plurality of tape measuring means, cog gears for transferring the rotational motion resulting from the extension of one of said plurality of tape measuring means to said counting means, and said plurality of gears being operatively connected to said shifter rod and positioned to operatively engage said cog gears.

6. The device as set forth in claim 1 wherein said plurality of tape measuring means includes at least two tapes extending from said housing in opposing directions, and said gear means includes at least one reversing idler gear adapted to reverse the rotational motion resulting from the extension of one of at least two tapes for rotating said counting means in a constant direction of rotation regardless of which of said tapes is extended from said housing.

7. The device as set forth in claim 1 wherein said counting means includes at least two linear indicia display wheels operatively engaged with said means for registering the sum of the distances to which said plurality of tape measuring means are extended from said housing, and said display wheels are operatively engaged so that one revolution of one display wheel causes the other display wheel to rotate proportionately thereto.

* * * * *